(12) United States Patent
Hoskins

(10) Patent No.: US 10,274,690 B2
(45) Date of Patent: Apr. 30, 2019

(54) ENCLOSURE WITH REMOVABLE FRAME

(71) Applicant: TOTAL CABLE SOLUTIONS, INC., Springboro, OH (US)

(72) Inventor: Charles Hoskins, Miamisburg, OH (US)

(73) Assignee: Total Cable Solutions, Inc., Springboro, OH (US)

( * ) Notice: Subject to any disclaimer, the term of this patent is extended or adjusted under 35 U.S.C. 154(b) by 0 days.

(21) Appl. No.: 15/912,775

(22) Filed: Mar. 6, 2018

(65) Prior Publication Data

US 2018/0259733 A1 Sep. 13, 2018

Related U.S. Application Data

(60) Provisional application No. 62/467,987, filed on Mar. 7, 2017.

(51) Int. Cl.
*G02B 6/44* (2006.01)

(52) U.S. Cl.
CPC ........... *G02B 6/445* (2013.01); *G02B 6/4452* (2013.01)

(58) Field of Classification Search
CPC .............................. G02B 6/445; G02B 6/4452
See application file for complete search history.

(56) References Cited

U.S. PATENT DOCUMENTS

| 4,792,203 | A | 12/1988 | Nelson et al. |
| 5,109,467 | A | 4/1992 | Hogan et al. |
| 5,459,808 | A | 10/1995 | Keith |
| 6,654,536 | B2 | 11/2003 | Battey et al. |
| 7,348,499 | B1 | 3/2008 | Cox |
| 7,471,867 | B2 | 12/2008 | Vogel et al. |
| 2005/0100302 | A1 | 5/2005 | Schray |
| 2012/0308189 | A1* | 12/2012 | Kimbrell ............. G02B 6/4471 385/135 |

OTHER PUBLICATIONS

FiberSource; Building Distribution Cabinet | 6752; brochure Issue Date: Sep. 15, 2010.
Fibersource; FiberSource Fiberoptic Connectivity Solutions; Building Distribution Cabinet 6756-12 (OSP); brochure Issue Date Apr. 20, 2011.

* cited by examiner

*Primary Examiner* — Omar R Rojas
(74) *Attorney, Agent, or Firm* — Thomas E. Lees, LLC

(57) ABSTRACT

An enclosure for splicing a trunk line from outside a building to inside the building comprises a housing, a removable frame, and a splice tray. The housing includes a back and a sidewall comprising a wall portion and a gap. The removable frame is removably coupled to the back of the housing and comprises an adaptor plate, a splice tray coupler, and a wall. The wall of the removable frame fills in the gap of the sidewall of the housing. Further, the splice tray couples to the removable frame via the splice tray coupler of the removable frame.

10 Claims, 6 Drawing Sheets

ENCLOSURE WITH REMOVABLE FRAME

CROSS REFERENCE TO RELATED APPLICATIONS

This application claims the benefit of U.S. Provisional Patent Application Ser. No. 62/467,987, filed Mar. 7, 2017, entitled ENCLOSURE WITH REMOVABLE FRAME, the disclosure of which is hereby incorporated herein by reference.

BACKGROUND

Various aspects of the present invention relate generally to enclosures for splicing cables (e.g., optical fiber, wire, etc.) and specifically to enclosures for splicing cables for distribution inside a structure.

When installing a fiber optic cable in a structure, a trunk line cable feeds into the structure and must be spliced to individual fiber optic cables running throughout the structure. A splice tray is used to couple the trunk line to the individual fiber optic cables: the fiber optic trunk coupled to one portion of the splice tray, and the individual fiber optic cables couple to another portion of the splice tray.

The splice tray is usually contained in an enclosure that protects the splice tray and ends of the trunk line and the individual cables from dust, moisture, etc. Such enclosures further include cable adaptor plates, a bulkhead, a splice tray holder, cable management hardware such as cable tie downs, etc.

BRIEF SUMMARY

According to aspects of the present disclosure, an enclosure for splicing a trunk line from outside a building to inside the building comprises a housing, a removable frame, and a splice tray. The housing includes a back and a sidewall comprising a wall portion and a gap. The removable frame is removably coupled to the back of the housing and comprises an adaptor plate, a splice tray coupler, and a wall. The wall of the removable frame fills in the gap of the sidewall of the housing. Further, the splice tray couples to the removable frame via the splice tray coupler of the removable frame.

According to further aspects of the present disclosure, an enclosure for splicing a trunk line from outside a building to inside the building comprises a housing, a removable frame, and a splice tray. The housing includes a back with four raised couplers, and each raised coupler comprises a slot to receive a clip. Further, the housing includes a sidewall comprising a gap and a wall portion with an opening that is separate from the gap and allows an internal cable from the building to access an inside of the enclosure. The removable frame is removably coupled to the back of the housing and comprises a backplate that includes a backside that includes four clips such that each clip couples to the slot of a corresponding raised coupler so the removable frame removably couples to the housing via the four clips and the four raised couplers. Further, the removable frame includes a splice tray coupler, an adaptor plate, cable management hardware, cable tie downs, and a wall comprising an opening for a cable to access an inside of the enclosure. Moreover, the wall of the frame fills in the gap of the sidewall of the enclosure when the removable frame is within the housing. The splice tray couples with the splice tray coupler of the removable frame and creates a first section in the enclosure and a second section in the enclosure. The removable frame resides in the first section of the enclosure and does not extend into the second section of the enclosure. Moreover, the housing comprises a first hinged door that closes over the first section of the enclosure and a second hinged door that closes over the second section of the enclosure.

DETAILED DESCRIPTION

According to aspects of the present disclosure, an enclosure for splicing cables (e.g., fiber optic cables, electrical wire cables, etc.) includes a housing and a removable frame (also called a shell) that has hardware (e.g., a splice tray coupler, an adaptor plate, cable management hardware, combinations thereof, etc.) for splicing a first cable to a second cable or to individual lines in a building. For example, a trunk line cable that feeds a building may be spliced to a cable or individual lines that run throughout the building.

Further, walls of the removable frame double as a wall of the enclosure by filling in gaps in walls of the housing. This provides advantages over current solutions where only a splice plate or adaptor plate is removable. For example, an installer may remove the removable frame from the enclosure and place the removable frame on a work table for ease of installation. Moreover, the installer can perform all necessary steps for installation while the removable frame is removed from the enclosure: splicing the cables, tying down the cables, making everything look nice, etc. Then, the installer may reattach the removable frame to the enclosure without any tedious work being done in the enclosure itself.

Figure 1:
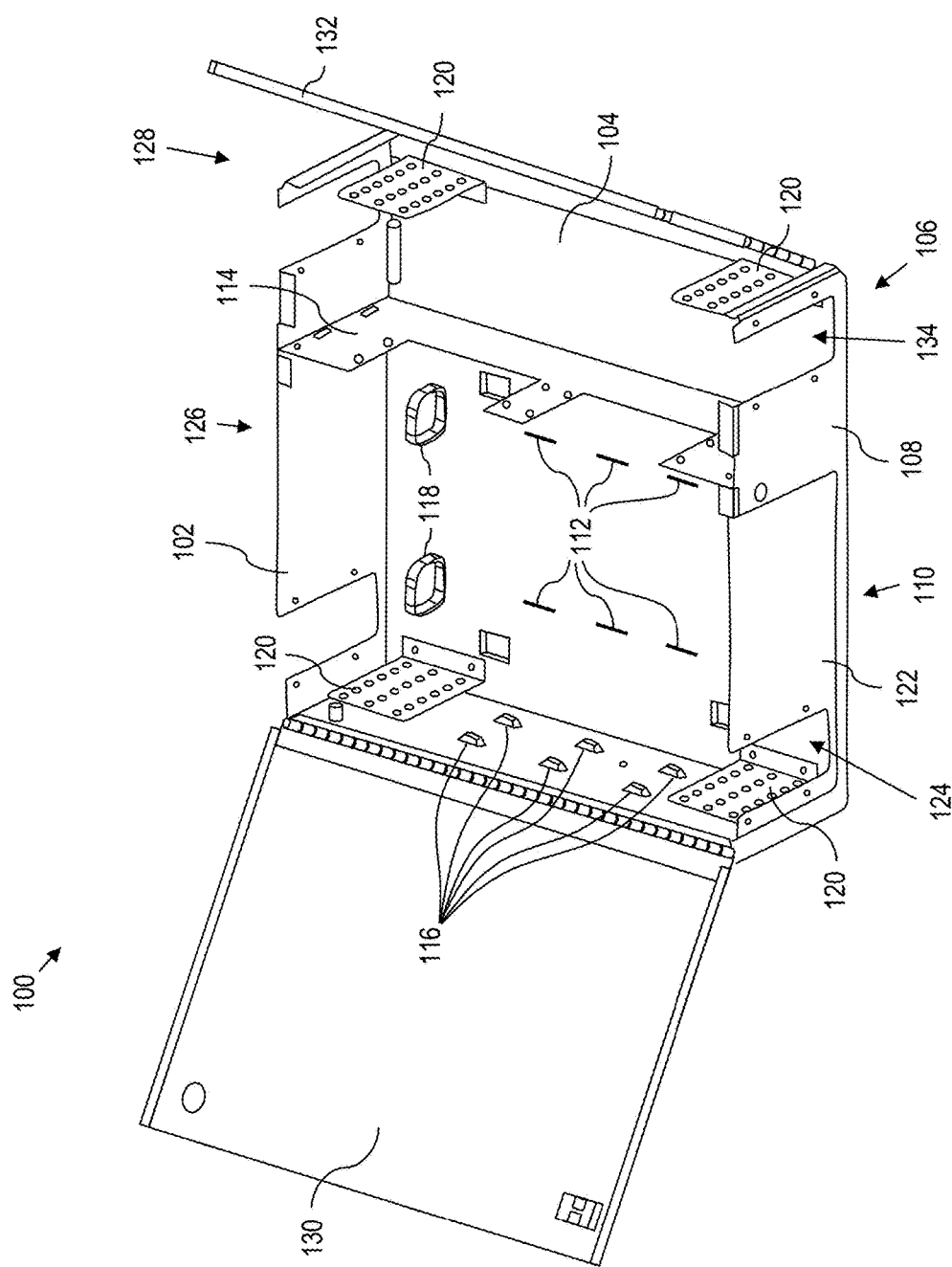
FIG. 1 is a drawing of an enclosure with a removable frame, where doors of the enclosure are open, according to various aspects of the present disclosure.

Turning now to the figures, and in particular to FIG. 1, an enclosure 100 with a removable frame 102 is shown. The enclosure 100 includes a housing 104, which includes a sidewall 106 comprising a wall 108 and a gap 110. Further, the enclosure includes splice tray couplers 112 that are used to hold a splice tray (see FIGS. 6-7) that couples cables from an external trunk line to individual cables. Thus, when the removable frame 102 is removed from the housing 104, the splice tray (which is coupled to the removable frame 102 through the splice tray couplers 112) goes with the removable frame 102.

Moreover, the removable frame 102 includes an adaptor plate 114 that may couple the spliced fiber optic trunk line to the individual cables that run throughout the building. For example, the splice tray may include pigtails that run from the splice tray to the adaptor plate 114. When an installer splices the trunk line to the pigtails, the adaptor plate 114 can finish the coupling to the individual lines when the removable frame 102 is placed in the housing 104. In other words, while the installer is splicing the trunk line to pigtails of the splice plate, the removable frame 102 is removed from the housing 104 so the installer may work. Once the removable frame 102 is placed back in the housing 104, the adapter plate 114 aligns the pigtails with the individual cables that run through the building.

Further, the removable frame 102 may include cable tie-downs 116, cable management hardware 118, guides 120. Thus, when the installer is splicing the trunk line to the adapter plate 114, the installer can use the cable tie-downs 116, the cable management hardware 118, and the guides 120 to keep the removable frame 102 neat and clean while the removable frame 102 is removed from the housing 104.

When the removable frame 102 is disposed within the housing 104, a wall 122 of the removable frame 102 is disposed near the gap 110 of the housing wall 108. Thus, the wall 122 of the removable frame 102 fills in the gap 110 of the sidewall 110 of the housing 104. However, the wall 122 of the removable frame 102 may also include an opening 124 for an exterior trunk line (not shown) to enter the enclosure 100.

When disposed in the housing 104, the removable frame 102 resides in a first section 126 of the enclosure 100. For example, the enclosure 100 may be divided into the first 126 and a second section 128 by the adaptor plate 114, and the removable frame 102 may reside entirely within the first section 126 of the enclosure 100 such that the removable frame 102 does not extend into the second section 128 (as shown in FIG. 1). On the other hand, the removable frame 102 may reside within the first section 126 of the enclosure 100 and still extend into the second section 128 (e.g., the removable frame 102 extends past the adaptor plate 114).

In some embodiments, the enclosure 100 includes a hinged door 130 that covers at least a portion of the enclosure 100. For example, the hinged door 130 may close over the first section 126 of the housing, and a second hinged door 132 may cover the second section 128 when closed. As another example, the hinged door 130 may cover the entire enclosure 100 when closed. In any case, when closed, the hinged door 130 (and possibly the second hinged door 132) will be generally parallel to a back of the enclosure 100. Thus, an installer may open the hinged door 130 (and possibly the second hinged door 132 if present) to access the removable frame 102.

The second portion 128 of the housing 104 may include an opening 134 in the wall of the housing 104 that is separate from the gap 110. Thus, a cable (e.g., a cable that routes to an inside portion of a building) may enter the enclosure 100 through the opening 134.

When an installer is splicing a trunk line cable external to a building to individual fibers internal to the building, the enclosure 100 may already be mounted to a wall of the building. Thus, the installer may remove the removable frame 102 from the housing 104 and set the removable frame 102 on a table or other surface so the installer may work on the installation comfortably. For example, the installer may splice the external trunk line to the splice tray, couple the pigtails to the adaptor plate (if need be), tie down the cables using the cable tie-downs 116, and organize the cable using the cable management 118, all while the removable frame 102 is on the table (or other surface).

This is an improvement to the traditional way of splicing cables, where only the splice tray is removable from the enclosure. The cable management, cable tie downs, and adaptor plate (and/or bulkhead) are not part of the removable piece in traditional solutions. Thus, while the splicing may take place away from the enclosure, the rest of the cable management, tying down, cleanup, etc. is still performed in the enclosure, instead of taking place on a work table as in the present solution. In other words, the present solution includes a removable portion that houses all of the fiber products/management, instead of only a splice tray.

Once the installer performs all of the functions listed above while the removable frame 102 is on the work surface, the installer may couple the removable frame 102 back into the enclosure 100. With all of the fibers neatly arranged, the installer only needs to fit the trunk line in the opening 124 of the frame and close the doors 130, 132. This provides great advantage over traditional solutions, where the cable tie downs, cable management, etc. are not part of a removable piece, because the installer would be forced to manage the cables while the removable piece is within the enclosure.

Figure 2:
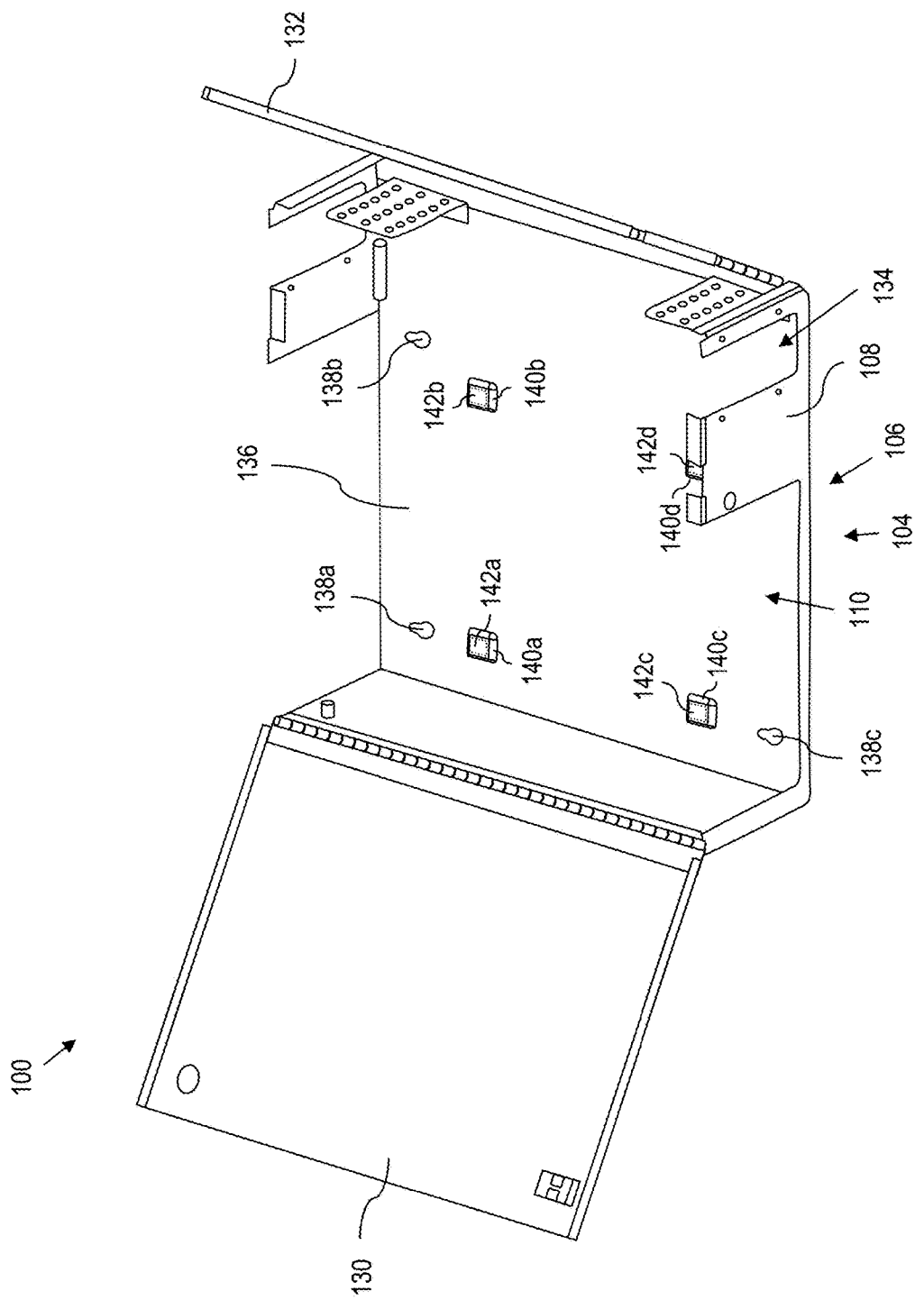
FIG. 2 is a drawing of a housing of an enclosure with a removable frame, where the removable frame has been removed, according to various aspects of the present disclosure.

Turning now to FIG. 2, the housing 104 of the enclosure 100 is shown with the removable frame (102, FIG. 1) removed. As shown in FIG. 1, the housing 104 includes the sidewall 106 with a wall 108, a gap 110, and an opening 134. Further, the housing 104 includes a first door 130 and a second door 132 (although, as discussed above, only one door may be used in some embodiments). Again, the gap 110 of the sidewall 106 may be at least partially filled in by the wall 122 of the removable frame 102.

Further, the housing 104 comprises a back section 136 including building couplers 138a-c (a fourth building coupler is hidden behind the wall 108) (collectively 138), which can couple to headed couplers (e.g., screws, nails, any object with a shaft and a head, etc.) within a wall of the building in which the enclosure 100 resides. For example, four screws may be embedded in the wall of the building, and the heads of the screws fit within the building couplers 138. As shown, there are four building couplers 138; however, any number of building couplers 138 may be used to securely couple the enclosure 100 to the building.

Moreover, the back 136 of the housing 104 also includes raised couplers 140a-d (collectively 140), and each of the raised couplers 140 includes a slot 142a-d (collectively 142) for coupling the removable frame (102, FIG. 1) to the housing 104. As shown, there are four raised couplers 140, but any number of raised couplers 140 may be used. The manner in which the removable frame couples to the housing is discussed in greater detail with reference to FIG. 3.

Figure 3:
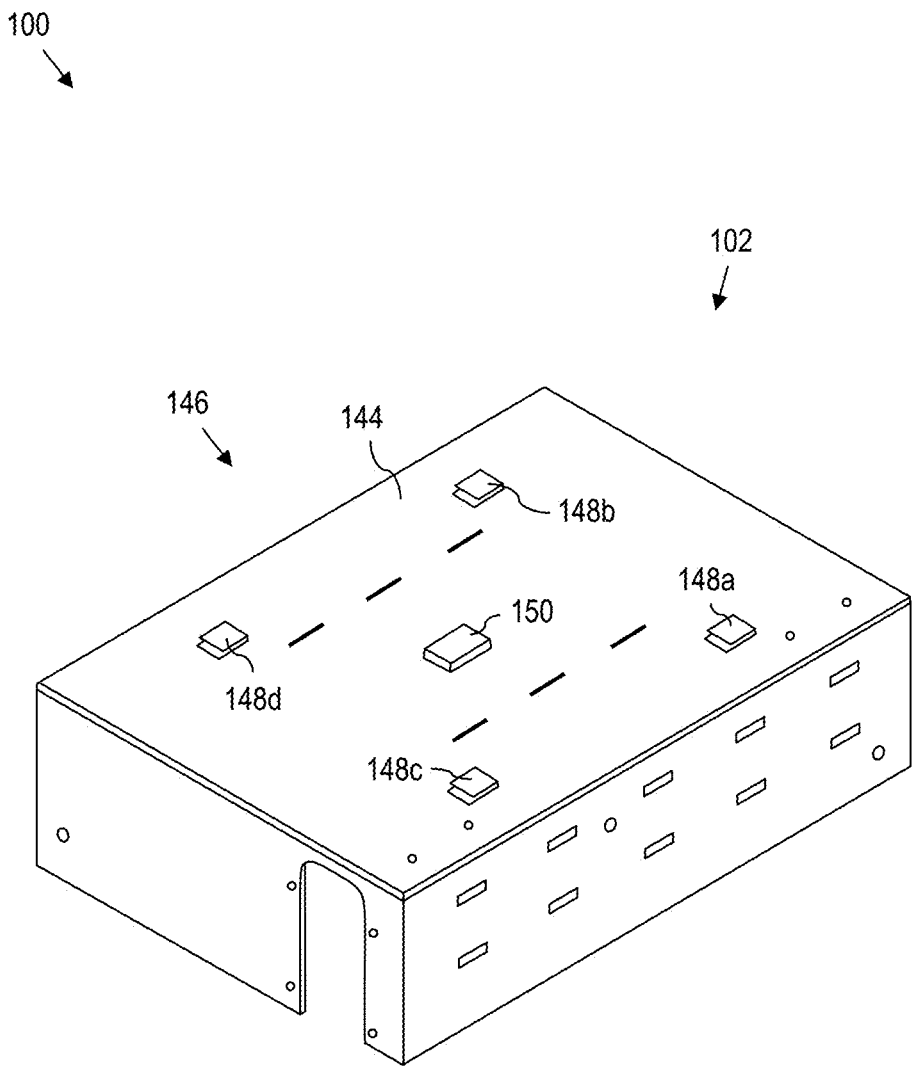
FIG. 3 is a drawing of a front side of a removable frame of an enclosure with a removable frame, according to various aspects of the present disclosure.

Turning to FIG. 3, a backside 144 of a back plate 146 the removable frame 102 is shown. The backside 144 of the back plate 146 includes clips 148a-d (collectively 148) that fit into corresponding slots (142, FIG. 2) of the raised couplers (140, FIG. 2) of the housing (104, FIG. 2). Thus, an installer may couple the removable frame 102 to the housing (104, FIG. 2) of the enclosure 100 by sliding the clips 148 into the slots (142, FIG. 2), and gravity will keep the removable frame 102 in place. When the installer wants to remove the removable frame 102 from the enclosure 100, the installer lifts the removable frame 102 such that the clips 148 disengage from the slots 142. Thus, the removable frame 102 removably couples to the housing (104, FIG. 2) via the clips 148 and the raised couplers 140.

Further, the backside 144 of the removable frame 102 may include a bumper 150 (e.g., rubber, plastic, etc.). Thus, when the removable frame 102 is coupled to the housing (104, FIG. 2), the backside 144 of the removable frame 102 will not scrape against the back (136, FIG. 2) of the housing (104, FIG. 2). Instead, the bumper 150 will rest against the back (136, FIG. 2) of the housing (104, FIG. 2). As shown there is one rectangular bumper 150, but the bumper 150 may be any shape, and there may be any number of bumpers 150. Further, the bumper 150 may be located on the back (136, FIG. 2) of the housing (104, FIG. 2) instead of or in addition to the back plate 146 of the removable frame 102.

Figure 4:
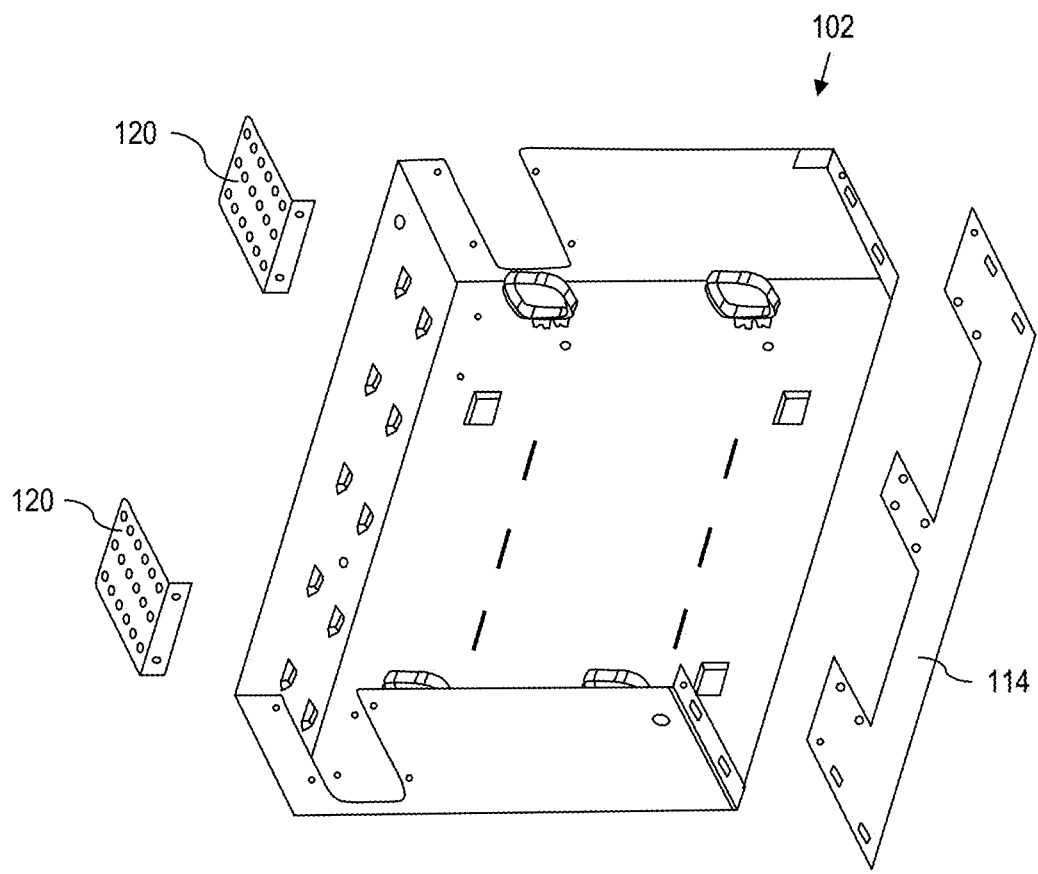
FIG. 4 is a drawing of a back side of a removable frame of an enclosure with a removable frame, according to various aspects of the present disclosure.

FIG. 4 illustrates the removable frame 102 with the adaptor plate 114 removed. Further, the guides 120 may be removed, as shown in FIG. 4.

Figure 5:
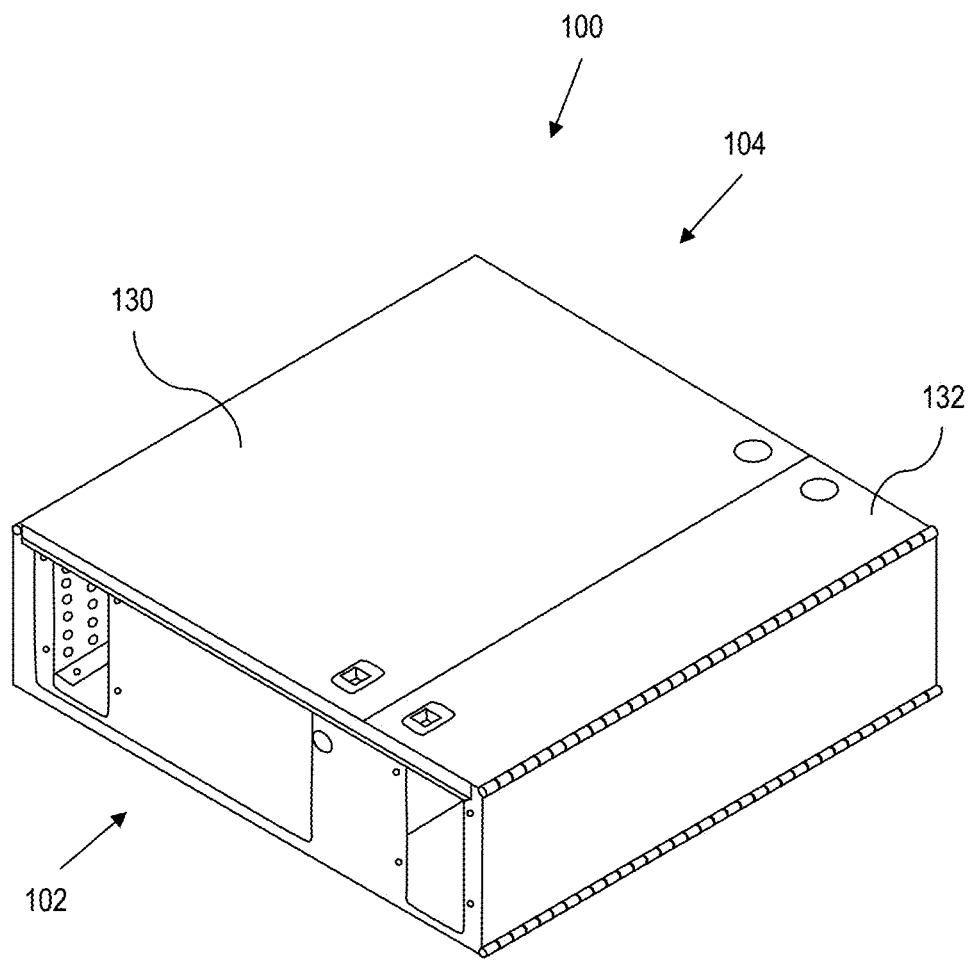
FIG. 5 is a drawing of an enclosure with a removable frame, where doors of the enclosure are shut, according to various aspects of the present disclosure.

FIG. 5 illustrates the enclosure 100 with the removable frame 102 coupled to the housing 104 with the first door 130 and the second door 132 closed.

Figure 6:
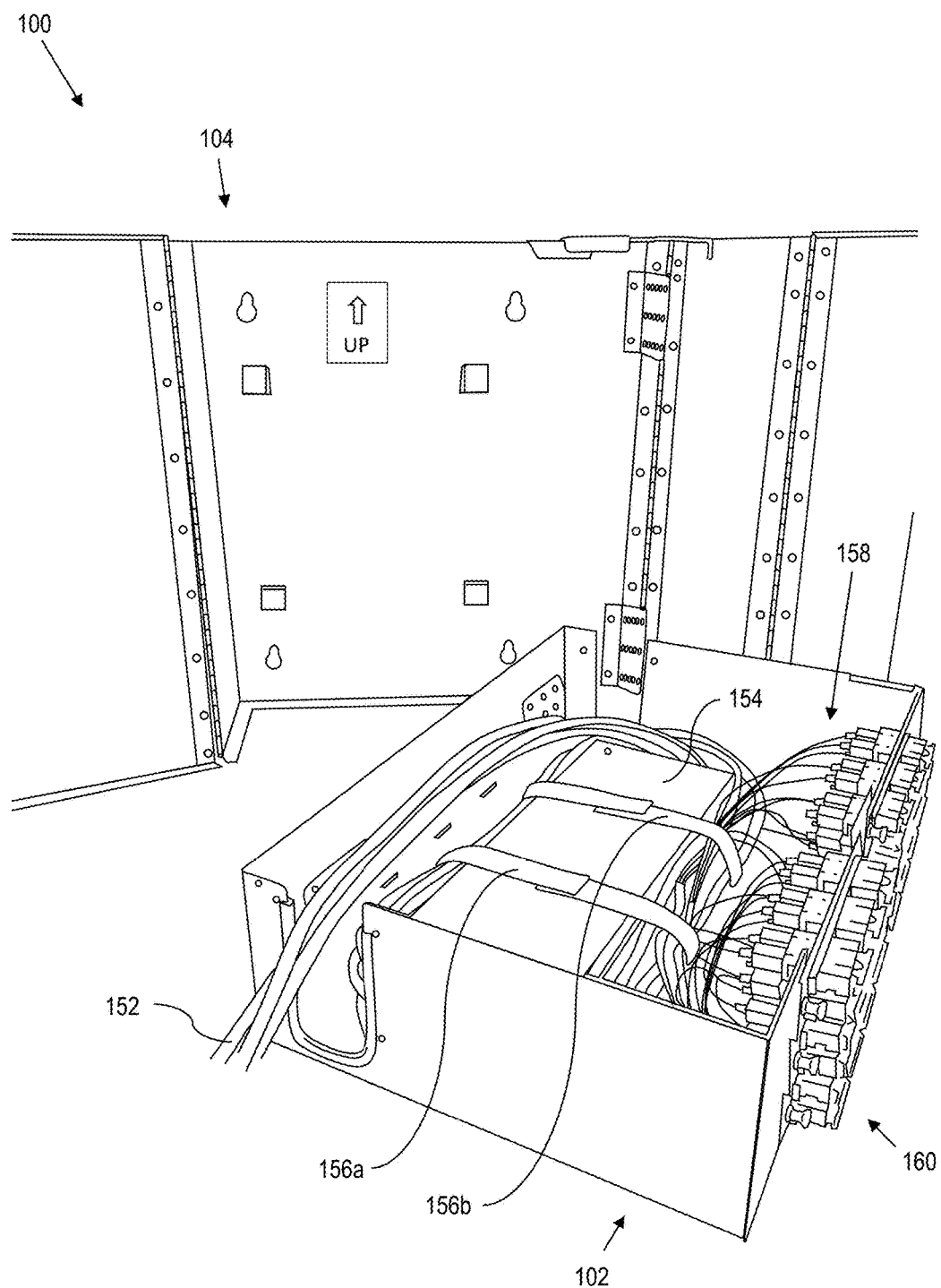
FIG. 6 is a photograph of an enclosure with a removable frame with the removable frame removed from the enclosure and a trunk line spliced to a splice tray of the removable frame, according to various aspects of the present disclosure.

FIG. 6 is a photograph of the enclosure with the removable frame 102 separated from the housing 104, with a trunk line 152 coupled to a splice tray 154. Further, the trunk line 152 may be secured with a binding 156 (e.g., two hook and loop fasteners 156a, 156b in FIG. 6). Moreover, as discussed above, individual wires 158 couple the splice tray 154 to pigtails 160.

As mentioned above, the enclosures described herein are improvements to the traditional way of splicing cables, where only the splice tray is removable from the enclosure. The cable management, cable tie downs, and adaptor plate (and/or bulkhead) are not part of the removable piece in traditional solutions. Thus, while the splicing may take place away from the enclosure, the rest of the cable management, tying down, cleanup, etc. is still performed in the enclosure, instead of taking place on a work table as in the present solution. In other words, the present solution includes a removable portion that houses all of the fiber products/management, instead of only a splice tray.

Once the installer performs all of the functions listed above while the removable frame is on the work surface, the installer may couple the removable frame back into the enclosure. With all of the fibers neatly arranged, the installer only needs to fit the trunk line in the opening of the frame and close the doors This provides great advantage over traditional solutions, where the cable tie downs, cable management, etc. are not part of a removable piece, because the installer would be forced to manage the cables while the removable piece is within the enclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. An enclosure comprising:
    a housing comprising:
        a back; and
        a sidewall comprising:
            a wall; and
            a gap;
    a removable frame that is removably coupled to the back of the housing, the removable frame comprising:
        an adaptor plate that creates a first section in the enclosure and a second section in the enclosure;
        a splice tray coupler; and
        a wall, wherein the wall of the frame fills in the gap of the sidewall of the housing;
        wherein the removable frame resides in the first section of the enclosure and does not extend into the second section of the enclosure; and
    a splice tray that couples with the splice tray coupler of the removable frame.

2. The enclosure of claim 1, wherein the housing further comprises:
    a first hinged door that closes over the first section of the enclosure; and
    a second hinged door that closes over the second section of the enclosure.

3. The enclosure of claim 1, wherein the housing further comprises a hinged door that closes over the enclosure such that the hinged door is generally parallel with the back of the enclosure when closed.

4. The enclosure of claim 1, wherein:
    an inside of the back of the housing includes a raised coupler with a slot; and
    a backside of a back plate of the removable frame includes a clip that fits the slot of the raised coupler such that the removable frame removably couples to the housing via the clip and the raised coupler.

5. The enclosure of claim 1, wherein:
    an inside of the back of the housing includes four raised couplers, wherein each raised coupler includes a slot; and
    a backside of a back plate of the removable frame includes four clips such that each clip couples to the slot of a corresponding raised coupler such that the removable frame removably couples to the housing via the four clips and the four raised couplers.

6. The enclosure of claim 5, wherein the backside of the back plate of the removable frame further comprises a bumper such that the bumper rests against the inside of the back of the housing when the removable frame is coupled to the housing.

7. The enclosure of claim 1, wherein the removable frame further comprises cable management hardware.

8. The enclosure of claim 1, wherein the wall of the removable frame further includes an opening for a cable to access an inside of the enclosure.

9. The enclosure of claim 1, wherein the wall of the housing further includes an opening that is separate from the gap, wherein the opening allows a cable to access an inside of the enclosure.

10. An enclosure comprising:
    a housing comprising:

a back comprising an inside that includes four raised couplers, wherein each raised coupler includes a slot; and a sidewall comprising:

a gap; and a wall comprising an opening that is separate from the gap, wherein the opening allows a cable to access an inside of the enclosure;

a removable frame that is removably coupled to the back of the enclosure, the removable frame comprising:

a splice tray coupler;

an adaptor plate;

cable management hardware;

a wall comprising an opening for a cable to access an inside of the enclosure, wherein the wall of the frame fills in the gap of the sidewall of the enclosure; and a backplate that includes a backside that includes four clips such that each clip couples to the slot of a corresponding raised coupler such that the removable frame removably couples to the housing via the four clips and the four raised couplers;

a splice tray that couples with the splice tray coupler of the removable frame and creates a first section in the enclosure and a second section in the enclosure;

wherein:

the removable frame resides in the first section of the enclosure and does not extend into the second section of the enclosure;

the housing further comprises:

a first hinged door that closes over the first section of the enclosure; and a second hinged door that closes over the second section of the enclosure.

* * * * *